United States Patent [19]

Okano et al.

[11] Patent Number: 4,785,333
[45] Date of Patent: Nov. 15, 1988

[54] BLIP MARKING RECORDER IN A MICROFILM DUPLICATING APPARATUS

[75] Inventors: Takeshi Okano, Nishinomiya; Sadaaki Nakaoka, Osaka, both of Japan

[73] Assignee: Fuji Photo Film Co., Ltd., Kanagawa, Japan

[21] Appl. No.: 64,032

[22] Filed: Jun. 19, 1987

[30] Foreign Application Priority Data

Jun. 20, 1986 [JP] Japan .................. 61-145639
Jun. 24, 1986 [JP] Japan .................. 61-149214

[51] Int. Cl.⁴ .......................................... G03B 27/52
[52] U.S. Cl. ...................... 355/39; 355/41; 355/45; 354/109
[58] Field of Search .............. 355/5, 39–41, 355/45, 54; 354/109

[56] References Cited

U.S. PATENT DOCUMENTS 4,324,484  4/1982  Johnson .................. 355/5
4,701,046  10/1987  Shiga .................... 355/39

Primary Examiner—L. T. Hix
Assistant Examiner—D. Rutledge
Attorney, Agent, or Firm—Sughrue, Mion, Zinn, Macpeak & Seas

[57] ABSTRACT

A blip marking recorder for a microfilm duplicating apparatus for duplicating images, recorded on a master film, onto a duplicate film through a photographic optical system, which comprises a blip marking imprinting mechanism disposed between the master film and the duplicate film for imprinting a blip marking for retrieval at a location between each of the neighboring frames of the duplicate film.

6 Claims, 2 Drawing Sheets

BLIP MARKING RECORDER IN A MICROFILM DUPLICATING APPARATUS

BACKGROUND OF THE INVENTION

1. Field of Technology

The present invention generally relates to a microfilm duplicating apparatus and, more particularly, to a blip marking recorder in the microfilm duplicating apparatus for imprinting blip markings on a duplicate microfilm being duplicated.

2. Description of the Prior Art

From, for example, the Japanese Laid-open Patent Publication No. 58-149572 and the U.S. Pat. Nos. 4,561,769 and No. 4,600,291, and the U.S. Pat. No. 4,671,648, an electrophotographic microfilming apparatus is well known, which apparatus can be advantageously utilized, for the purpose of documentation and storage of documents, for recording images of documents on a reduced scale on an electrophotographic microfilm.

While the microfilming apparatus of the type referred to above and utilizing the 2-reel microfilm cassette of a type disclosed in, for example, the U.S. Pat. Nos. 4,572,649 and 4,685,638, is satisfactory, office documentation at different sections or departments of an establishment such as an office, a company or an institute would be expedited if identical recordings of the particular documents are readily available at the respective sections or departments. If only one recording of the documents is available in the establishment, it will often happen that an office clerk belonging to a particular section or department has to resort to the different section or department where the recording is kept.

If recording of documents is made on a photographic material such as, for example, a microfiche or a roll of film utilizing silver halide materials, the identical recordings of the documents can be relatively quickly and efficiently prepared by the use of a well-known contact printing technique wherein an unexposed photographic recording medium is held in contact with the photographic master recording at the time of exposure to the illuminating light and is, thereafter, developed and fixed to produce images identical with those born in the master recording.

However, when it comes to the electrophotographically recorded microfilm, any technique similar to the photographic contact printing technique cannot be employed in making duplications of the electrophotographically recorded microfilm because the electrophotographic recording system requires a process of electrostatic charging, exposure, development and fixing all sequentially subjected to the electrophotographic recording medium.

In view of the foregoing, when documents are to be recorded or duplicated on the encased electrophotographic recording medium, that is, the electrophotographic recording medium contained in the 2-reel cassette, the number of the microfilm cassettes required has to be determined before the documents are actually recorded, or very time-consuming and complicated procedures are required at the time the necessity arises for one or more extra microfilm cassettes having the identical recordings of the particular documents. Should one or more extra microfilm cassettes be needed, for example, for distribution to the different sections or departments of the establishment, and if the necessity has arisen after one microfilm cassette had been prepared, those jobs which have been executed for the preparation of such one microfilm cassette have to be repeated.

Accordingly, in a microfilm duplicating system wherein no contact printing technique can be employed, each of the images recorded on the master microfilm must be optically reproduced at equal magnification and then projected onto the unexposed microfilm for duplication.

Thus, where the optical system is used, numerous requirements not hitherto encountered have to be satisfied in view of the fact that each frame of the microfilm which bears the respective image to be duplicated is very minute. Such requirements include that the minute image must be reproduced at 1:1 magnification, a high resolution must be attained, and the optical system must be so designed as to cope with various limitations imposed by the microfilm cassette, where duplication is desired to be made with the use of the previously discussed electrophotographic microfilms encased in the respective cassettes, because of the relationship with the processing head operable to execute an electrophotographic process from the electrostatic charging to the fixing, particularly the relationship with the electrophotographic development, and also because of the presence of limitations resulting from the position of the cassette specified to achieve a stabilized movement of the microfilm.

In view of the foregoing, the assignee of the present invention has suggested a novel microfilm duplicating apparatus satisfying the numerous optical requirements for duplicating images, recorded on a master microfilm, on a duplicate microfilm at a high resolution, which apparatus is provided with a compact and simple photographic optical system.

SUMMARY OF THE INVENTION

The present invention has for its object to provide the microfilm duplicating apparatus of a type, suggested by the assignee of the present invention, with a blip marking recorder capable of recording blip markings accurately and simultaneously with the duplicating of the images on the duplicate microfilm.

In order to accomplish the above described object of the present invention, a blip marking recorder for imprinting blip markings for use in retrieval of particular images duplicated on the duplicate microfilm is arranged and disposed in the microfilm duplicating apparatus at a location between the master microfilm and the duplicate microfilm.

According to the present invention, the blip markings are each recorded at a location between the neighboring frames of the duplicate microfilm where the images of the master microfilm have been recorded, respectively. For this purpose, preferably, the blip marking recorder herein disclosed is provided with a blip marking plate having a blip imprinting portion so designed and so positioned as to imprint each blip marking at a portion of the duplicate microfilm between the neighboring image-duplicated frames.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENTS

Figure 1:
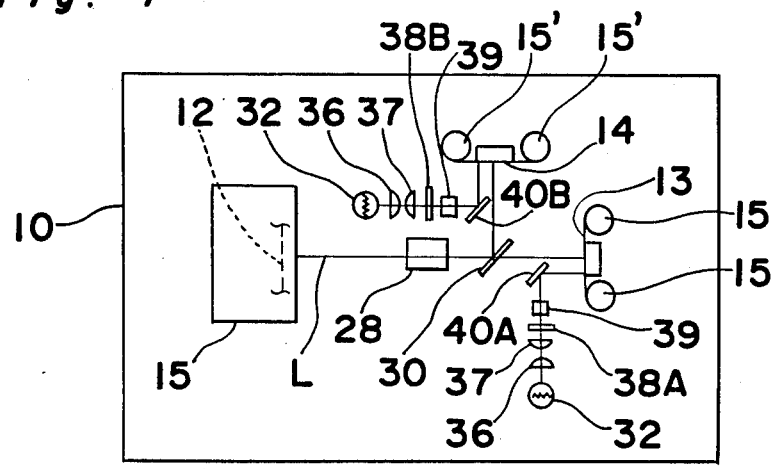
FIG. 1 is a schematic diagram showing a microfilm duplicating apparatus having a blip marking recorder incorporated therein according to the present invention.

Referring to FIG. 1, a microfilm duplication apparatus shown therein is so designed and so constructed that, while within a casing 10 a master microfilm 12, a first silver halide film 13 and a second silver halide film 14 are supported on a right-hand portion, a center right-hand and deep portion and a left-hand portion of the casing 10 with the plane of any one of the films 12, 13 and 14 lying vertically, images recorded on the master microfilm 12 can be duplicated on the first silver halide film 13 in the form of respective mirror images and on the second silver halide film 14 in the form of respective real images. It is to be noted that any one of the master microfilm 12 and the duplicate films 13 and 14 may be an electrophotographic film, a silver halide film, diazo film or a basicular film.

The master microfilm 12 is accommodated within a cassette 15 and is transported frame to frame by a drive motor. An illuminating lamp is disposed relative to the cassette 15 for illuminating the master film 12 from the rear.

The first silver halide film 13 is reeled to a pair of reels 15 and is guided by a plurality of guide rollers while transported by a pinch roller in cooperation with a capstan roller so as to move deep into the casing 10. Similarly, the second silver halide film 14 is transported rightwards into the casing 10.

An optical path extending between the master film 12 and the first silver halide film 13 is provided with an image forming lens assembly 28 having a magnification of 1. However, if desired, the image forming lens assembly 28 may have a magnification different from 1.

A movable reflective mirror 30 is disposed between the image forming lens assembly 28 and the first silver halide film 13 for movement between a reflecting position, in which the illuminating light bundle from the illuminating lamp can be deflected 45° so as to travel towards the second silver halide film 14, and a retracted position in which the illuminating light bundle can travel directly towards the first silver halide film 13 without being deflected.

A blip marking recorder is positioned frontwardly of each of the first and second silver halide films 13 and 14, which recorder comprises a lamp 32, condensing lenses 36 and 37, a blip marking plate 38A or 38B, an image forming lens unit 39 and a movable reflective mirror 40A or 40B supported for rotation between a retracted position, which it assumes when the images on the master microfilm 12 are being photographed, and an operative position; as shown in FIG. 1, which it assumes when blip markings are to be photographically imprinted.

In this construction, an illuminating light emerging from the lamp 32 is condensed by the condensing lenses 36 and 37 to illuminate the blip marking plate 38A or 38B, and a blip marking in the blip marking plate 38A or 38B is imprinted on each frame of the first and second silver halide films 13 and 14 one at a time through the respective image forming lens unit 39 and the respective movable mirrors 40A and 40B. (During the taking of the image on the first silver halide film, the movable mirror 40A is pivoted to the retracted position.)

Figure 2:
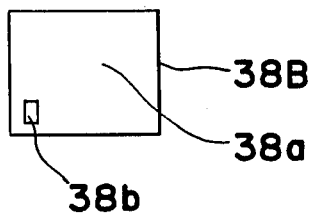
FIG. 2 is a front elevational view of a blip marking plate for positive duplication.
Figure 3:
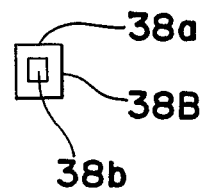
FIG. 3 is a view similar to FIG. 2 showing a modified form of the blip marking plate.
Figure 4:
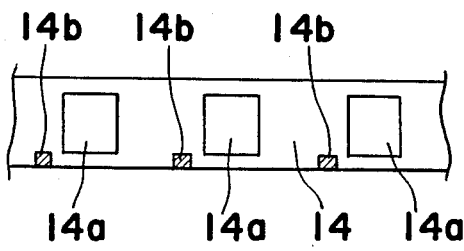
FIG. 4 is a front elevational view of a portion of a positive microfilm in which the blip markings have been imprinted.

The blip marking plate 38B associated with the second silver halide film 14 has, as best shown in FIGS. 2 and 3, a light shielding portion 38a so sized and so dimensioned as to cover a surface area larger than each frame of the second silver halide film 14 containing a respective image 14a. This light shielding portion 38a has a left-hand corner formed with a transparent marking hole 38b for imprinting a black-colored blip marking 14b at an edge portion of the film 14 between each of the neighboring frames. The blip marking plate 38B can be formed by exposing and developing a usual film so as to render the light shielding portion 38a to be blackened and the marking hole 38b to be transparent. Accordingly, the shape of a pattern can be selected to any desired shape, the freedom of which is very large.

It is to be noted that the blip marking plate 38B may be in the form of the light shielding portion 38a having the transparent marking hole 38b located at the center thereof as shown in FIG. 3.

Figure 5:
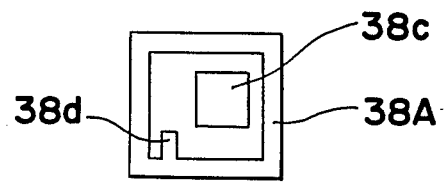
FIG. 5 is a view similar to FIG. 2 showing the blip marking plate for negative duplication.
Figure 6:
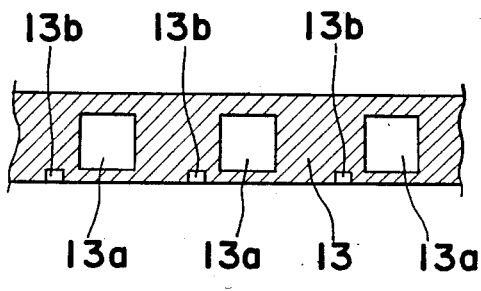
FIG. 6 is a view similar to FIG. 4, showing the negative microfilm having the blip markings recorded thereon.

The blip marking plate 38A associated with the first silver halide film 13 has, as best shown in FIGS. 5 and 6, a light shielding portion 38c so sized and so dimensioned as to cover a surface area larger than each frame of the first silver halide film 13 containing a respective image 13a. This light shielding portion 38c has a left-hand corner formed with a black-colored marking projection 38d for imprinting a transparent blip marking 13b at an edge portion of the film 13 between each of the neighboring frames. Even this blip marking plate 38B can be formed by the use of a usual photographic film in a manner identical with the blip marking plate 38B described hereinbefore.

Figure 9:
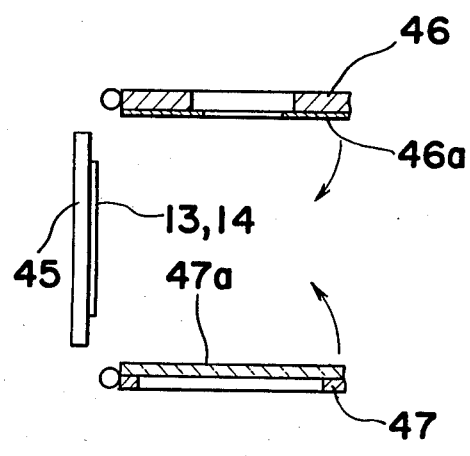
FIGS. 9 and 10 are sectional view of presser plate mechanisms, respectively.

In order to stabilize any one of the first and second silver halide films 13 and 14 during the image duplication as well as during the blip marking imprinting, as best shown in FIG. 9, it is preferred that, while a reference plate 45 is disposed rearwardly of the film 13 or 14, the use is made of a first presser plate 46 having an image mask 46a and capable of being pivotally lowered during the image duplication to press the film 13 or 14 against the reference plate 45, and a second presser plate 47 having a glass plate 47a and capable of being pivoted upwardly during the blip marking imprinting to press the film 13 or 14 against the reference plate 45.

In the foregoing embodiment, the blip marking recorder has been described as provided for each of the first and second silver halide films 13 and 14. However, in the embodiment which will be subsequently described with reference to FIG. 7, a common blip marking recorder is utilized for both of the first and second silver halide films 13 and 14.

Figure 7:
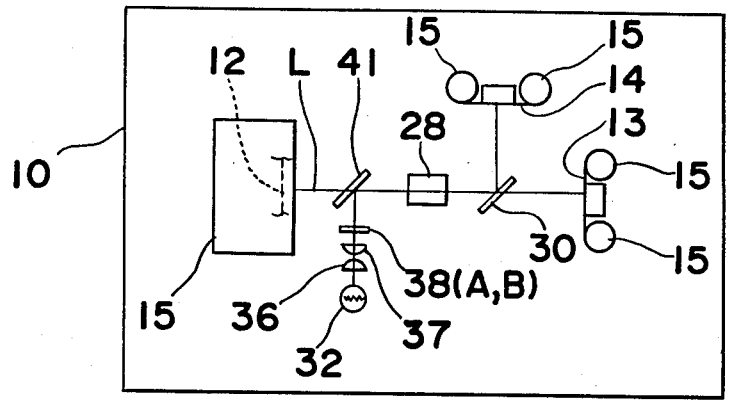
FIG. 7 is a view similar to FIG. 1, showing another preferred embodiment of the present invention.

Referring to FIG. 7, a movable reflective mirror 41 is disposed between the master film 12 and the image forming lens assembly 28 for pivotal movement between a retracted position, which it assumes during the image duplication, and an imprinting position in which the illuminating light bundle from the lamp 32 is deflected 90° so as to travel towards the films 13 and 14 through the image forming lens assembly 28 to imprint the blip marking on both of the first and second silver halide films 13 and 14. The marking plates 38A and 38B are alternately switched according to the films 13 and 14.

Figure 8:
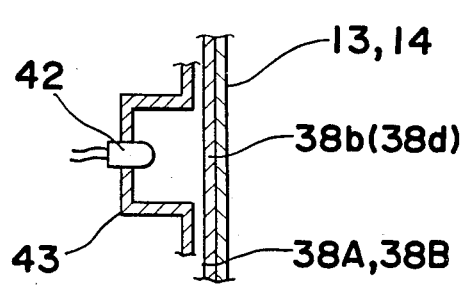
FIG. 8 is a sectional view of a modified form of the blip marking recorder.
Figure 10:
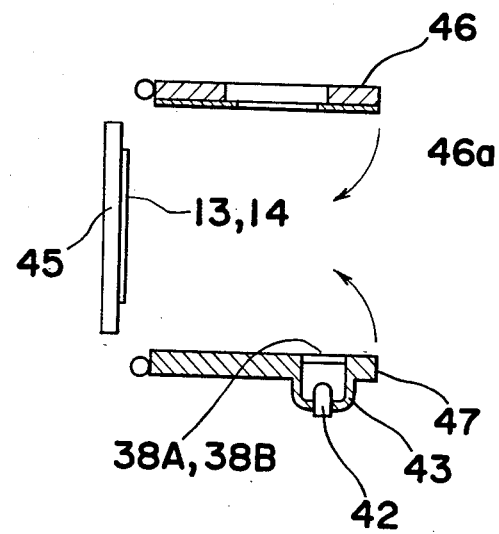

In the foregoing embodiment, the blip marking recorder has been shown and described as utilizing such an optical system as including the lenses 36, 37 and 39 and the mirror 40. However, arrangement may be made, such as shown in FIG. 8, wherein the blip marking plate 38A or 38B held in contact with the respective film 13 or 14 can be illuminated by a light emitting element 42, disposed within a light shielding box 43, to imprint the black blip marking 14b or the transparent blip marking 13b on such film 13 or 14. In such case, as shown in FIG. 10, the light shielding box 43 is formed in the second presser plate 47 with the blip marking plate 38A or 38B fitted to an opening of the light shielding box 43.

According to this embodiment, since the blip marking 13b or 14b can be imprinted on the associated film 13 or 14 at close distance, an illuminating lamp may suffice to be a small light emitting diode. Moreover, since no lens such as the lenses 36, 37 and 38 is employed, any of the blurred imprinting of the pattern edge, the distorted surface, the reduction in size or the enlargement in size, and the lack of sufficient marginal rays which would occur as a result of insufficient adjustment of optical components as well as reduction in performance of such optical components will not occur. Furthermore, the structure is so simple that the microfilming quality can be stabilized.

Of the apparatuses capable of forming a microimage on each frame of the film, there is a case wherein a master microfilm is prepared with the use of a processing head of a type disclosed in, for example, the U.S. Pat. No. 4,624,554. Since in the processing head of the above described type a blip marking sensor is arranged at a location aligned with a frame next to the frame being imagewise exposed, the position of the frame of the master microfilm can be accurately located by the blip marking imprinted on the frame next to such frame. Where when making a duplication of such the master microfilm the blip marking plates 38A and 38B shown in FIGS. 2 and 5 are used to imprint the blip markings to duplicate images, the blip markings so imprinted fail to align with the respective positions of the frames and, therefore, when the duplicated images are projected onto a screen, the projected images will displace partially out of the screen. In order to avoid this occurrence, at the time of preparation of the duplicate, it is recommended to imprint the blip marking and then, after the duplicate film has been advanced a distance corresponding to one frame, imprint an image on the microfilm. However, a step of moving the microfilm while the timings at which the blip marking and the image are respectively imprinted are displaced with respect to each other is intervened, not only does the apparatus tend to be complicated in structure, but also the high speed duplicating feature is impaired, and, although no problem substantially arise if the film is accurately moved a distance corresponding to one frame, any slight displacement in distance over which the film is advanced frame to frame would result in the displaced reproduction of the duplicated image. In view of this, where the apparatus is of a type wherein the positioning of the image relies on the blip marking imprinted on the frame next to the frame being duplicated, the blip marking imprinting has to be carried out with the use of such a blip marking plate 38A as shown in FIG. 11, the embodiment of which will now be described.

Figure 11:
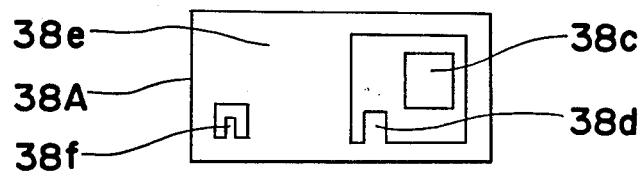
FIG. 11 is a view similar to FIG. 5, showing a modified form of the blip marking plate of FIG. 5.

The blip marking plate 38A associated with the first silver halide film 13 and shown in FIG. 5 may be constructed such as shown in FIG. 11. More specifically, as shown in FIGS. 6 and 11, the blip marking plate 38A shown in FIG. 11 has a light shielding portion 38c so sized and so dimensioned as to cover one of the frames 13a of the first silver halide film 13, and another light shielding portion 38e so sized and so dimensioned as to cover the neightboring frames 13a of the same first silver halide film 13. A left-hand corner of the blip marking plate 38A corresponding in position to the light shielding portion 38c is formed with a light shielding projection 38f of a substantial width, and a left-hand corner of the same corresponding in position to the light shielding portion 38e is formed with a black-colored marking projection 38d at an edge portion of the film 13 between the neighboring frames of the film 13, said black-colored marking projection 38d being utilized to imprint the transparent blip marking 13b. Even this blip marking plate 38A can be formed by the use of the usual photographic film in a manner identical with the blip marking plate 38B.

With the blip marking plate 38B of the construction shown in FIG. 11, the blip marking 14b can be imprinted through the marking hole 38b without the film being advanced and, therefore, during a high speed retrieval relying on the blip marking 14b, a desired image 14a can be highly accurately brought to a halt.

More specifically, where the blip marking 14b is imprinted between the neighboring frames of the film next to the images 14a, it is usual to imprint the blip marking 14b at the time the next succeeding blip marking 14b is to be imprinted, and since it may happen that the image 14a and the blip marking 14b can be displaced in position as a result of advance of the film, the image 14a cannot be highly accurately brought to a halt. However, according to the arrangement shown in FIG. 11, this possibility can be eliminated and no displacement in position occurs because of the simultaneous imprinting without the film advanced.

With the blip marking plate 38A of the above described construction, since during the photographic recording of the image 13a the blip marking 13b previously imprinted laterally of the image 13a is sufficiently largely covered by the light shielding projection 38d and, on the other hand, the blip marking 13b can be imprinted between the neighboring frames next to the image 13a without the film being advanced, such image 13a can be highly accurately brought to a halt even during the high speed retrieval relying on the blip marking 13b.

Thus, according to the present invention, the blip marking recorder is disposed between the master film and the duplicate film, so that each of the blip markings for use during the retrieval can be highly accurately imprinted between the neighboring frames of the film. Therefore, the retrieval of frames of the film can be accurately and reliably performed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. A blip marking recorder for a microfilm duplicating apparatus for duplicating images, recorded on a master film, onto a duplicate film through a photographic optical system, which recorder comprises a blip marking imprinting mechanism disposed between the master film and the duplicate film for imprinting a blip marking for retrieval at a location between each a pair of adjacent image frames of the duplicate film.

2. The recorder as claimed in claim 1, wherein the blip marking imprinting mechanism includes a blip marking plate having a blip marking imprinting portion through which the respective blip marking is imprinted on the duplicate film at a location aligned with a frame of the duplicate film next to the frame of the same which is then being imagewise exposed, whereby the position of the image frame of the master microfilm can be accurately located by the blip marking imprinted on the frame next to such frame, thereby highly accurately imprinting the blip markings for use during high speed retrieval of a given frame.

3. The recorder as claimed in claim 1 wherein the blip marking imprinting mechanism comprises a source of illuminating light and a blip marking plate, said light source being positioned on one side of the blip marking plate opposite to the duplicate film.

4. The recorder as claimed in claim 3 wherein said blip marking plate has a light shielding portion adapted to cover a surface area larger than each frame of the duplicate film, said light shielding portion having a corner formed with a print print marking hole for the passage of light therethrough to form the blip marking at an edge portion of the duplicate film between each pair of adjacent frames on the duplicate film.

5. The recorder as claimed in claim 3 wherein said blip marking plate has a light shielding portion adapted to cover a surface area larger than each frame of the duplicate film, said light shielding portion having a corner formed with a colored marking projection for blocking the passage of light from the light source to form the blip marking that is transparent, at an edge portion of the duplicate film between each pair of adjacent frames of the duplicate film.

6. The recorder as claimed in claim 1 wherein said blip marking imprinting mechanism comprises at least one shifting mirror, and means for shifting said shifting mirror from a first position in an optical path of the projected image from the master film towards said two duplicate films during blip marking, to a second position outside said optical path when exposing the two duplicate films to form the image from the master film such that the placement of the shifting mirror selectively impedes the imprinting of the master image in duplicate onto the two duplicate films.

* * * * *